Dec. 16, 1969          A. R. ERICKSON          3,483,766
SNOWMOBILE BELT DRIVE SPROCKET WHEEL CONSTRUCTION
Filed Oct. 4, 1968
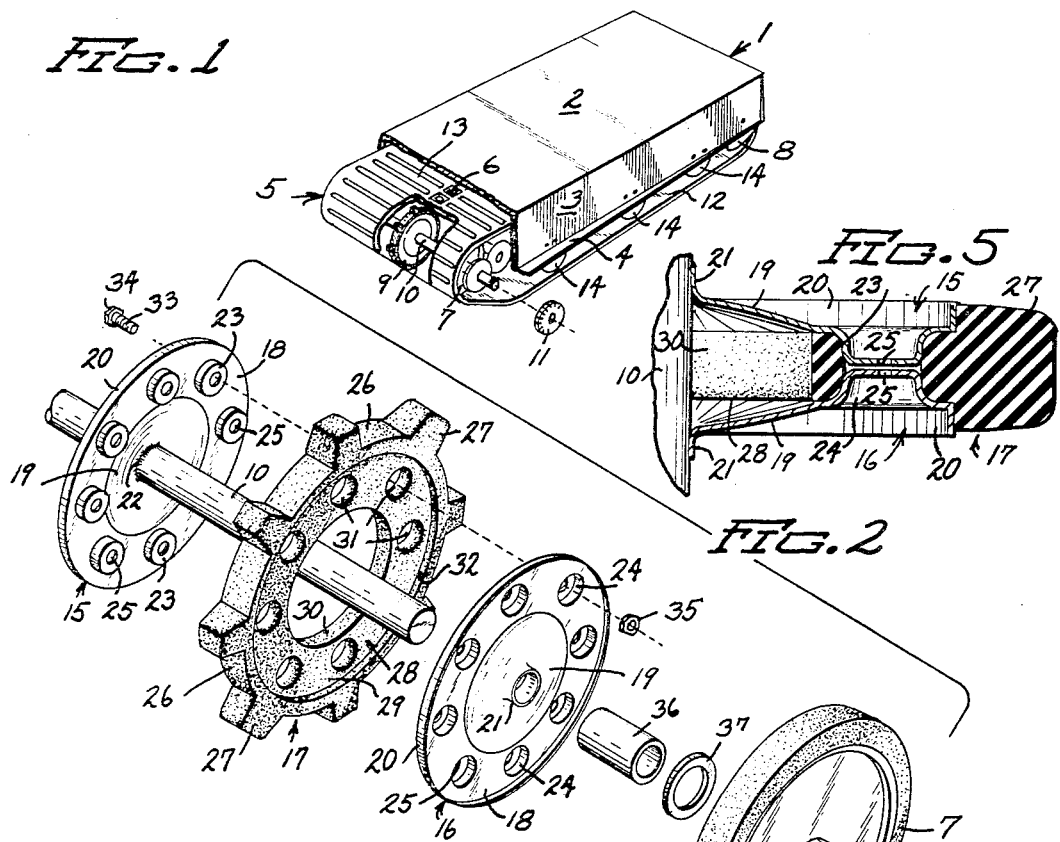
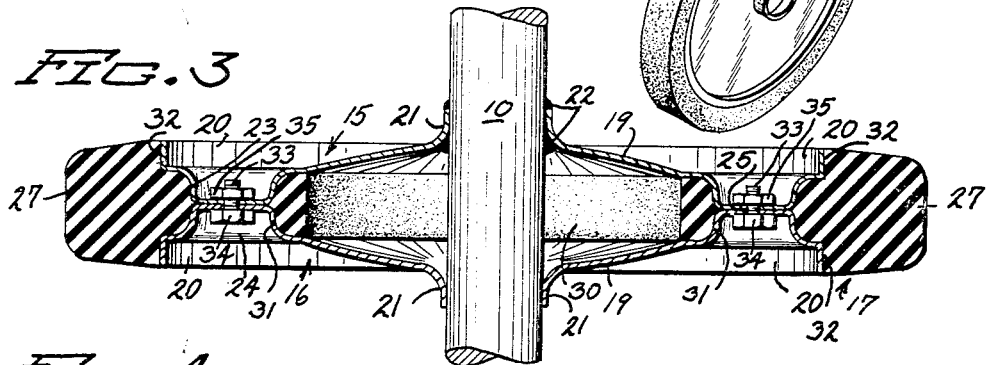
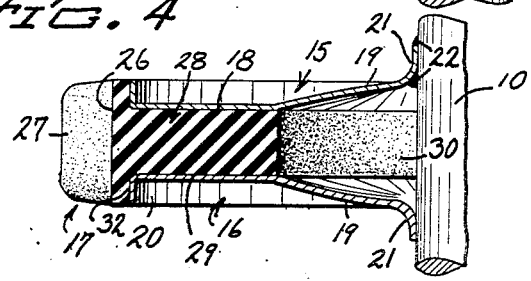
INVENTOR.
*Albin R. Erickson*
BY
*Merchant & Gould*
ATTORNEYS

United States Patent Office 3,483,766
Patented Dec. 16, 1969

3,483,766
SNOWMOBILE BELT DRIVE SPROCKET WHEEL CONSTRUCTION
Albin R. Erickson, Roseau, Minn., assignor, by mesne assignments, to Textron Inc., Providence, R.I., a corporation of Delaware
Filed Oct. 4, 1968, Ser. No. 765,199
Int. Cl. F16h 55/06, 55/16
U.S. Cl. 74—243                    10 Claims

ABSTRACT OF THE DISCLOSURE

A sprocket wheel for driving engagement with a ground-engaging endless drive belt or track for motor driven vehicles, such as snowmobiles, and involving an annular relatively resilient externally toothed sprocket element and a pair of relatively rigid disk elements for mounting the sprocket element on a drive shaft for common rotation therewith.

---

Sprocket wheels and gears utilizing resilient toothed elements and rigid side plates fastened thereto by fastening means, such as circumferentially spaced nut-equipped bolts or stud extending through aligned openings in the toothed elements and the side plates, are known. These have functioned satisfactorily under relatively low speeds and loads, and under operating conditions wherein no side thrust is involved. However, when such sprocket wheels are used to drive an endless drive track of the type used in propelling motor driven track equipped vehicles, such as snowmobiles, the rotary speed of the drive sprocket is usually quite high, and the resilient tooth-equipped sprocket element is subject to considerable centrifugal strain. Moreover, during steering movements of such vehicles, a high degree of side thrust is imposed upon the drive track, and from thence to the toothed drive sprocket element. These heavy strains have often caused the resilient sprocket elements to be torn loose from the side plate and connecting bolts or studs, resulting inearly failure of the sprocket wheel. Further, with the above-described construction, it has been heretofore difficult to obtain a uniform clamping pressure of the side plates against the adjacent sides of the resilient tooth-equipped sprocket element, so that the sprocket element tends to work loose from between the side plates at the area of least pressure.

An important object of this invention is the provision of a drive sprocket wheel for drive track-equipped vehicles, having an annular tooth-equipped resilient sprocket element and a pair of opposed side plates or disk elements, between which the sprocket element is clamped, with uniform clamping pressure applied to opposite sides of the sprocket element about the entire circumference of the clamped area.

Another object of this invention is the provision of a sprocket wheel as set forth, having a relatively resilient annular sprocket element and a pair of opposed relatively rigid side plates or disk elements arranged to more securely hold the sprocket element against deformation by centrifugal force, than heretofore.

Yet another object of this invention is the provision of a drive sprocket wheel construction in which the resilient sprocket element can be quickly and easily removed when worn, and as quickly and easily replaced.

To the above ends, a sprocket wheel is provided comprising a pair of opposed relatively rigid disk elements for mounting on a drive shaft, and an annular relatively resilient sprocket wheel element disposed between the disk elements. The sprocket wheel element includes a radially outer toothed tread portion and a radially inner annular wall portion of less axial thickness than the tread portion and having a plurality of circumferentially spaced holes therethrough. The disk elements have annular surface portions engaging the adjacent sides of the annular wall portion, and circumferentially spaced bosses that project into the holes through the annular wall portion. The axial length of the bosses is slightly less than one-half of the axial thickness of the annular wall portion, whereby the bosses of one of the disk elements are disposed in closely spaced end-to-end relationship with the bosses of the other disk element. Nut equipped bolts extend through aligned openings in the opposed bosses, and are tightened to securely clamp the annular wall portion of the sprocket element between the annular surface portions of the disk elements, and to bring the aligned pairs of bosses in each of the holes into end-to-end abutting engagement, whereby to apply uniform clamping pressure of the disks against the annular wall portion uniformly about the circumference of the annular surface portions of the disk elements. The disk elements are formed to provide axially projecting circumferential flanges that are disposed in face-to-face engagement with inner cylindrical surfaces on the tread portion of the sprocket element adjacent opposite sides of the annular wall portion thereof, to support the tread portion against inward radial loads.

DESCRIPTION OF THE DRAWINGS

FIG. 1 is a view in perspective of a portion of a snowmobile, including a frame and an endless drive track mounted thereon, and the drive sprocket wheel of this invention;

FIG. 2 is an enlarged exploded perspective of the drive sprocket wheel of this invention, and one of the idler wheels to support the drive track;

FIG. 3 is an enlarged fragmentary view in axial section of the drive sprocket wheel;

FIG. 4 is a fragmentary axial section of the sprocket wheel of FIG. 3, taken in a plane circumferentially spaced from that of FIG. 3; and FIG. 5 is a view corresponding to a portion of FIG. 3, with some parts removed.

GENERAL DESCRIPTION

The rear portion of a snowmobile frame 1 is illustrated in FIG. 1 as having a generally horizontal seating portion 2, laterally spaced sidewall portions 3 depending from the seating portion 2, and footrest portions 4, one of which is shown, projecting laterally outwardly from the lower edges of the sidewall portion 3. An endless drive belt or track 5 is mounted beneath and partially within the confines of the inverted generally U-shaped frame 1, and is preferably molded in a single piece from rubber or similar flexible material to provide a series of longitudinally spaced sprocket tooth engaging openings 6, intermediate the side edges of the track 5. The track 5 is entrained over front and rear pairs of idler wheels 7 and 8 respectively, one each of which is shown in FIG. 1, a drive sprocket wheel 9 and an idler sprocket wheel, not shown. The drive sprocket wheel 9 is mounted on a drive shaft 10 near the front end of the vehicle, for common rotation with the drive shaft 10, the idler wheels 7 being journaled on the drive shaft 10 in axially spaced relation to the drive sprocket wheel 9. The rear idler wheels 8, as well as the rear idler sprocket wheel, not shown, are suitably mounted on a transverse shaft, not shown, but suitably mounted in the rear end portion of the frame 1. The drive shaft 10 is also journalled in suitable bearings, not shown, at the front end portion of the frame 1, and has mounted thereon a conventional metallic sprocket wheel 11 that may be assumed to be operatively connected to the usual driving motor customarily mounted on the front end of the vehicle.

As mounted in the frame 1, the drive track 5 provides a ground-engaging lower drive run 12 and an upper return run 13. Intermediate the wheels mounted on the front drive shaft 10 and the rear wheels 8 are a plurality of sets or groups of bogie wheels 14 that are carried by the frame 1 in the usual and well known manner, and which bear against the lower drive run 12 of the track 5 to hold the lower drive run 12 in driving contact with the ground. The bogie wheels 14 and their respective mounting means do not, in and of themselves, comprise the instant invention. Hence, for the sake of brevity, further showing and description thereof is omitted.

It is well known that metallic sprocket wheel and chain drives produce a substantial amount of vibration in power transmission mechanism; hence, in order to reduce vibration in the drive train of a snowmobile to a minimum, the drive track 5 is preferably made of rubber or similar material, as above indicated. Further, to dampen vibration, drive sprocket wheels using rubber teeth or tooth-equipped tread portions are used to drive the track 5. The drive sprocket wheel 9, of this invention comprises a pair of axially spaced opposed disk elements 15 and 16, and an annular sprocket element 17 disposed between the disc elements 15 and 16. The disk elements 15 and 16 are substantially identical, being stamped from sheet metal or otherwise formed to provide relatively rigid structures, the sprocket element 17 being molded or otherwise formed from rubber or similar material to provide a relatively resilient structure.

The disk elements 15 and 16 are each formed to provide a radially outer preferably flat annular portion 18, a generally frusto-conical radially inner portion 19, an axially outwardly projecting outer cylindrical flange 20 at the outer marginal edge of the annular portion 18, and a radially inner, axially outwardly projecting flange 21 which defines an opening for the drive shaft 10. The flanges 21 snugly slidably encompass the drive shaft 10, the flange 21 of the disk element 15 being welded to the drive shaft 10, as indicated at 22. The generally flat, annular portions 18 of the disk elements 15 and 16 are formed to provide a plurality of circumferentially spaced axially inwardly projecting hollow bosses 23 that define axially outwardly opening recesses 24, the axially inner ends of the recesses having axial openings 25 therethrough. As shown in FIGS. 2–4, each boss 23 of the disk element 15 is adapted to be disposed in axially aligned end-to-end relationship with a different boss 23 of the disk element 16.

The annular sprocket element 17 is formed to provide a radially outer tread portion 26 having a plurality of sprocket teeth 27 projecting radially outwardly therefrom, and a radially inner annular wall portion 28 shown as having opposite flat side surfaces 29, the annular wall portion 28 defining a central opening 30 of substantially greater diameter than that of the drive shaft 10. The annular wall portion 28 is formed to provide a plurality of circumferentially spaced holes 31 extending in the direction axially therethrough, for reception of the bosses 23 of the disk elements 15 and 16. Preferably, the construction of the bosses 23 of the disk elements 15 and 16, and the annular wall portion 28 of the sprocket element 17 is such that the axial length of each boss 23 is slightly less than one-half of the axial thickness of the annular wall portion 28. As shown, the tread portion 26 of the sprocket element 17 has an axial dimension that is substantially greater than the axial thickness of the annular wall portion 28, the tread portion 26 having a pair of inner cylindrical surfaces 32 adjacent the opposite side surfaces 29 of the annular wall 28 and disposed in face-to-face engagement with the outer cylindrical flanges 20 of the disk elements 15 and 16. The disk elements 15 and 16 are rigidly coupled together, with the sprocket element 17 securely clamped therebetween, by a plurality of machine screws or bolts 33, having heads 34 and cooperating clamping nuts 35. Each of the screws 33 extends through an aligned pair of recess openings 25, their respective nuts 35 being tightened thereon until the adjacent ends of the aligned bosses 23 are disposed in abutting engagement, as shown in FIG. 3. The bosses 23, being of uniform axial length, and the annular wall portion 28 being of uniform axial thickness adjacent the holes 31, the above described tightening of the nuts 35 on their respective screws 33 imparts a uniform clamping pressure of the disk elements 15 and 16 against the annular wall portion 28 of sprocket element 17. Thus, the resilient sprocket element 17 is uniformly reinforced about its entire circumference so as to withstand extreme axial thrust such as occurs when the vehicle is steered to one side or the other of a given line of direction. It will be further noted that the diameters of the holes 31 and bosses 23 are of sufficiently large size to provide substantial interengaging circumferential surfaces therebetween whereby to minimize the danger of rupture of the annular wall portion 28 due to centrifugal force when the sprocket wheel 9 is rotated at high speeds. It will be appreciated that, when a snowmobile is driven at high cruising or racing speeds, the drive sprocket wheel 9 is rotated at speeds between 3,000 and 4,000 r.p.m. At such speeds, the centrifugal force action on the resilient sprocket element 17 of a sprocket wheel having a pitch diameter in the neighborhood of 7 or 8 inches, is extremely high. It has been found through extensive tests that, by applying uniform clamping pressure of the disk elements 15 and 16 to the annular wall portion 28, and by employing bosses 23 of substantially greater diameter than the mounting screws 33, the sprocket wheel of this invention readily withstands the radial and axial forces applied thereto by high speed operation and steering movements, without distortion or fracture.

With further reference to FIG. 3, it will be seen that the recesses 24 are of substantially greater axial and diametrical dimensions than the screw heads 34 and clamping nuts 35 so that the screws 33 and clamping nuts 35 are completely contained in their respective recesses 24. Thus, the clamping screws and nuts 33 and 35 respectively are protected from engagement with foreign objects such as stones and twigs which might otherwise be caught thereby and interfere with smooth running operation of the drive sprocket wheel 9 and track 5.

The frusto-conical portions 19 of the disks 15 and 16 are angularly displaced from the planes of their respective annular portions 18 in a direction opposite the bosses 23. Thus, when the sprocket wheel 9 is assembled on the shaft 10, the frusto-conical portions 19 converge radially outwardly from the shaft 10 toward the anular portions 18, to provide substantial reinforcement to the sprocket wheel 9 in a direction axially thereof.

The idler wheels 7 are preferably journalled on the drop shaft 10, and are maintained on axially spaced apart relationship to the drive sprocket wheel 9 by tubular spacers 36 and suitable washers 37, one each of which is shown in FIG. 2, slidably mounted on the shaft 10 between opposite sides of the sprocket wheel 9 and the idler wheels 7.

When the teeth 27 of the resilient sprocket element 17 become worn to a degree where replacement is necessary, it is only necessary to replace the resilient sprocket element 17. This is accomplished by removing the sprocket wheel 11 and one of the idler wheels 7, washers 37 and spacers 36 from the drive shaft 10, after which the clamping nuts 35 are removed from the screws 33 and the disk element 16 axially slidably removed from the drive shaft 10, together with the worn resilient sprocket element 17. The sprocket element 17 is then removed from the disk element 16 and a new sprocket element mounted on the disk 16 and replaced on the drive shaft 10 and in operative engagement with the disk element 15. The screws 33 are then reinserted and the clamping nuts 35 screw threaded thereon to securely anchor the elements 15 and 16 together, after which the bushing 36, washer 37, idler wheel 7 and sprocket wheel 11 are replaced on the drive shaft 10.

Although not shown, a conventional removable bearing for the drive shaft 10 adjacent the sprocket wheel 11, is also removed and replaced during the sprocket element replacement operation.

It will be noted that the outer circumferential flanges 20 of the disk elements 15 and 16 not only add rigidity to the disk elements but also provide substantial support for the tread portion 26 of the sprocket element 17 against radially inward thrust of the drive track 5, thus preventing any distortion to the sprocket element 17 during operation of the vehicle.

What is claimed is:

1. A drive sprocket wheel for a motor driven vehicle including a drive shaft and a ground engaging endless drive track having longitudinally spaced sprocket tooth engaging portions, said drive sprocket wheel comprising:
    (a) a pair of (opposed) relatively rigid disk elements adapted for mounting on a drive shaft for common rotation therewith;
    (b) an annular relatively resilient sprocket element disposed between said disk elements;
    (c) said sprocket element including a radially outer sprocket tooth equipped annular tread portion and a radially inner annular wall portion defining an axial shaft receiving opening and having opposite sides and a plurality of circumferentially spaced holes extending in a direction axially therethrough;
    (d) each of said disk elements having an annular surface portion for face to face engagement with an adjacent one of said sides of the annular wall portion, and a plurality of circumferentially spaced bosses projecting axially from said annular surface portion, each of said bosses being snugly received in a different one of said holes in the annular wall portion, whereby each boss in one of said disk elements is disposed in axially aligned end to end relationship with a respective one of the bosses in the other of said disk elements;
    (e) said bosses each having an axial length slightly less than one-half of the axial thickness of said annular wall adjacent said holes;
    (f) and means for rigidly securing each of said bosses in end to end abutting engagement with their respective bosses, whereby said annular wall is tightly clamped between said annular surface portions of said disk elements.

2. The drive sprocket wheel according to claim 1 in which said sprocket element tread portion defines a pair of radially inner cylindrical surfaces adjacent said opposite sides of the annular wall portion, said disk elements each having an axially projecting outer circumferential flange in face-to-face engagement with an adjacent one of said cylindrical surfaces.

3. The drive sprocket wheel according to claim 1 in which said bosses define axially outwardly opening recesses and axial apertures, said last-mentioned means comprising clamping screws extending through said axial apertures and having heads disposed in respective ones of the recesses, and clamping nuts screw threaded on said screws within opposite ones of said recesses, said recesses being of an axial depth to fully receive the screw heads and clamping nuts.

4. The drive sprocket wheel according to claim 1 in which said mounting means comprises an axially projecting inner circumferential flange on one of said disk elements defining an axial opening for snug reception of the drive shaft, said inner flange being welded to said drive shaft.

5. The drive sprocket wheel according to claim 4 in which said disk elements are substantially identical, the other of said disk elements having an inner circumferential flange defining an axial opening slidably encompassing the drive shaft.

6. A drive sprocket wheel for a motor driven vehicle including a drive shaft and a ground-engaging endless drive track having longitudinally spaced sprocket tooth-engaging portions, said drive sprocket wheel comprising:
    (a) a pair of opposed relatively rigid disk elements;
    (b) an annular relatively resilient sprocket element disposed between said disk element;
    (c) mounting means on one of said disk elements for rigidly mounting the same on the drive shaft for common rotation therewith;
    (d) and anchoring means for releasably anchoring the other of said disks to said one of the disks;
    (e) said sprocket element including a radially outer tooth equipped cylindrical tread portion and a radially inner flat annular wall portion defining an axial opening for said shaft, said annular wall portion having opposite generally flat sides and a plurality of circumferentially spaced holes extending in a direction axially therethrough, said tread portion having generally cylindrical radially inner surfaces adjacent said opposite sides of the annular wall portion;
    (f) each of said disk elements having a flat annular surface portion for face-to-face engagement with an adjacent one of said flat sides of the annular wall portion, a radially outer axially projecting circumferential flange in face-to-face engagement with an adjacent one of said inner cylindrical surfaces, and a plurality of circumferentially spaced bosses each disposed within a different one of said openings in said annular wall portion, thereby the bosses of one of said disks are disposed in end-to-end relationship with the respective bosses of the other of said disks, said bosses having axial openings therethrough;
    (g) said anchoring means comprising clamping nut equipped headed screws extending through the openings in respective pairs of said bosses.

7. The drive sprocket wheel according to claim 6 in which said mounting means comprises an axially projecting inner circumferential flange on said one of the disks, said inner flange defining an axial opening for snug reception of the drive shaft, said inner flange being welded to said drive shaft.

8. The drive sprocket wheel according to claim 6 in which said disks are substantially identical and further include axially projecting radially inner circumferential flanges and generally frusto-conical portions between said flat annular portions and said inner circumferential flanges, said inner flanges being disposed in encompassing engagement with said shaft.

9. The drive sprocket wheel according to claim 8 in which said mounting means comprises one of said inner circumferential flanges welded to said shaft.

10. The drive sprocket wheel according to claim 8 in which said generally frusto-conical portions converge radially outwardly from said inner flanges toward said flat annular wall portion of the sprocket element.

References Cited

UNITED STATES PATENTS

| | | |
|---|---|---|
| 2,188,025 | 1/1940 | Weiss. |
| 2,721,485 | 10/1955 | Bombardier _____ 74—243 |
| 2,827,796 | 3/1958 | Erickson _____ 74—244 |
| 3,169,408 | 2/1965 | Rouverol _____ 74—443 XR |

FRED C. MATTERN, Jr., Primary Examiner

JAMES A. WONG, Assistant Examiner

U.S. Cl. X.R.

74—443, 461